United States Patent
Voss et al.

(10) Patent No.: US 9,783,152 B2
(45) Date of Patent: Oct. 10, 2017

(54) VEHICLE IMPACT REDUCTION STRUCTURE

(75) Inventors: Mark A. Voss, Richmond, MI (US); Leonard J. Brohl, Jr., Ortonville, MI (US); Anil A. Masih, Royal Oak, MI (US); Carl B. Corman, Farmington Hills, MI (US); William C. Bliss, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 690 days.

(21) Appl. No.: 13/270,306

(22) Filed: Oct. 11, 2011

(65) Prior Publication Data

US 2013/0088042 A1    Apr. 11, 2013

(51) Int. Cl.
*B60R 21/34* (2011.01)
*B62D 25/16* (2006.01)

(52) U.S. Cl.
CPC ............ *B60R 21/34* (2013.01); *B62D 25/163* (2013.01); *B60R 2021/343* (2013.01)

(58) Field of Classification Search
CPC ............................... B62D 25/12; B60R 21/34
USPC .............. 296/187.04, 187.03, 187.09, 198; 248/274.1
See application file for complete search history.

(56) References Cited

U.S. PATENT DOCUMENTS

| | | | | |
|---|---|---|---|---|
| 3,918,540 A | * | 11/1975 | Haupt | 180/69.2 |
| 4,186,476 A | * | 2/1980 | Mair et al. | 29/407.1 |
| 5,273,341 A | * | 12/1993 | Cornille, Jr. | 296/193.11 |
| 5,482,348 A | * | 1/1996 | Mass et al. | 296/207 |
| 5,682,667 A | * | 11/1997 | Flagg | 29/460 |
| 5,988,305 A | * | 11/1999 | Sakai et al. | 296/187.04 |
| 6,554,341 B2 | * | 4/2003 | Lee | 296/29 |
| 6,612,644 B2 | * | 9/2003 | Ahn | 296/187.04 |
| 6,676,197 B2 | * | 1/2004 | Ozawa | 296/187.03 |
| 6,698,820 B2 | * | 3/2004 | Nakata | 296/193.09 |
| 6,767,052 B2 | * | 7/2004 | Kubota | 296/203.02 |
| 6,817,435 B2 | * | 11/2004 | Takeuchi | 180/274 |
| 6,938,715 B2 | * | 9/2005 | Hamada et al. | 180/274 |

(Continued)

FOREIGN PATENT DOCUMENTS

| | | |
|---|---|---|
| CN | 1845841 A | 10/2006 |
| CN | 101513900 A | 8/2009 |

(Continued)

*Primary Examiner* — Hilary Gutman
(74) *Attorney, Agent, or Firm* — Quinn IP Law

(57) ABSTRACT

A vehicle structure comprising a body including a wheel house, a fender and an energy absorption member. The fender has an exposed A-side surface and an opposed B-side surface, with the fender including a laterally inner edge extending fore-and-aft that defines a portion of a hood opening, and the B-side surface adjacent to the laterally inner edge spaced from the wheel house in a vertical direction to define a crush gap. The energy absorption member is located in the crush gap between the wheel house and the fender, with the energy absorption member having a fender attachment flange secured to the B-side surface of the fender adjacent to the laterally inner edge, a body attachment flange secured to the wheel house, and an energy absorbing portion extending between the fender attachment flange and the body attachment flange, with the energy absorbing portion being curved in the vertical direction.

2 Claims, 2 Drawing Sheets

(56) References Cited

U.S. PATENT DOCUMENTS

| | | | |
|---|---|---|---|
| 7,316,448 B2 * | 1/2008 | Koyama et al. | 296/192 |
| 7,357,446 B2 * | 4/2008 | Sakai et al. | 296/192 |
| 7,469,955 B2 * | 12/2008 | Patterson et al. | 296/187.03 |
| 7,677,779 B2 * | 3/2010 | Schwab | 362/546 |
| 7,740,307 B2 * | 6/2010 | Benvenuto et al. | 296/192 |
| 7,828,374 B2 * | 11/2010 | Rinderlin et al. | 296/198 |
| 2002/0060474 A1 * | 5/2002 | Chung | 296/189 |
| 2002/0063443 A1 * | 5/2002 | Lee | 296/198 |
| 2003/0155788 A1 * | 8/2003 | Cordebar et al. | 296/29 |
| 2004/0007901 A1 * | 1/2004 | Weik et al. | 296/198 |
| 2004/0251716 A1 * | 12/2004 | Choi et al. | 296/187.03 |
| 2005/0057076 A1 * | 3/2005 | Roux et al. | 296/198 |
| 2006/0113825 A1 * | 6/2006 | Marijnissen et al. | 296/198 |
| 2006/0125289 A1 * | 6/2006 | Marijnissen et al. | 296/198 |
| 2006/0131931 A1 * | 6/2006 | Marijnissen et al. | 296/198 |
| 2009/0206633 A1 * | 8/2009 | Feeser et al. | 296/198 |
| 2010/0314518 A1 * | 12/2010 | Steinhilb et al. | 248/274.1 |

FOREIGN PATENT DOCUMENTS

| | | |
|---|---|---|
| DE | 2922893 A1 | 11/1980 |
| DE | 10206768 A1 | 9/2003 |
| DE | 10232799 A1 | 2/2004 |
| DE | 10233474 A1 | 2/2004 |
| DE | 10244455 A1 | 5/2004 |
| DE | 10311221 A1 | 9/2004 |
| DE | 102009020281 A1 | 11/2010 |
| EP | 1129928 A2 | 9/2001 |

* cited by examiner

VEHICLE IMPACT REDUCTION STRUCTURE

BACKGROUND OF INVENTION

The present invention relates generally to structure for automotive vehicles and more particularly to vehicle structure that improves energy absorption of impacts.

Automotive vehicles are, of course, driven along roads where many pedestrians walk. It is desirable to provide vehicle structure that may minimize the results of an impact with a pedestrian while minimizing the cost and packaging space needed to provide for this protection. Moreover, it is desirable that any structure used for this purpose does not detract from vehicle esthetics or interfere with air flow around the vehicle or under the vehicle hood.

SUMMARY OF INVENTION

An embodiment contemplates a vehicle structure comprising a body including a wheel house, a fender and an energy absorption member. The fender has an exposed A-side surface and an opposed B-side surface, with the fender including a laterally inner edge extending fore-and-aft that defines a portion of a hood opening, and the B-side surface adjacent to the laterally inner edge spaced from the wheel house in a vertical direction to define a crush gap. The energy absorption member is located in the crush gap between the wheel house and the fender, with the energy absorption member having a fender attachment flange secured to the B-side surface of the fender adjacent to the laterally inner edge, a body attachment flange secured to the wheel house, and an energy absorbing portion extending between the fender attachment flange and the body attachment flange, with the energy absorbing portion being curved in the vertical direction.

An advantage of an embodiment is that the shape of the energy absorption member allows the fender to deflect during a pedestrian event, with the crush of the energy absorption member absorbing energy of impact. This energy absorption may reduce any potential pedestrian injuries. This is accomplished while minimizing the number of parts needed, maintaining good vehicle esthetics, maintaining good underhood air flow, and minimizing packaging spaced required to accomplish the energy absorbing function.

DETAILED DESCRIPTION

Figure 1:
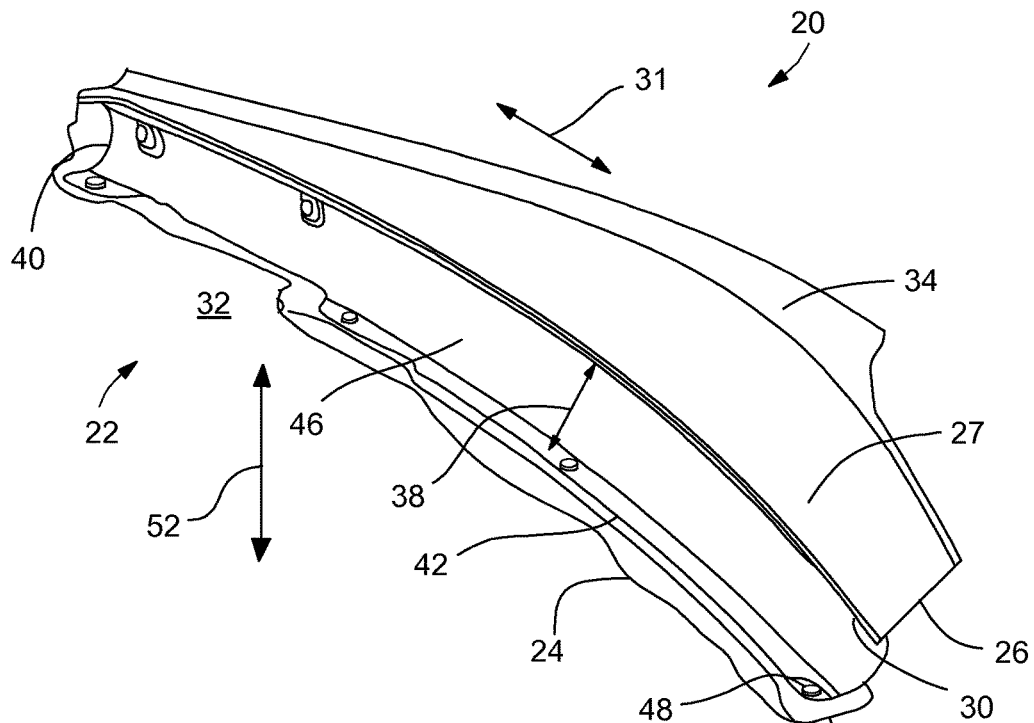
FIG. 1 is a schematic, perspective view of a portion of an automotive vehicle.
Figure 2:
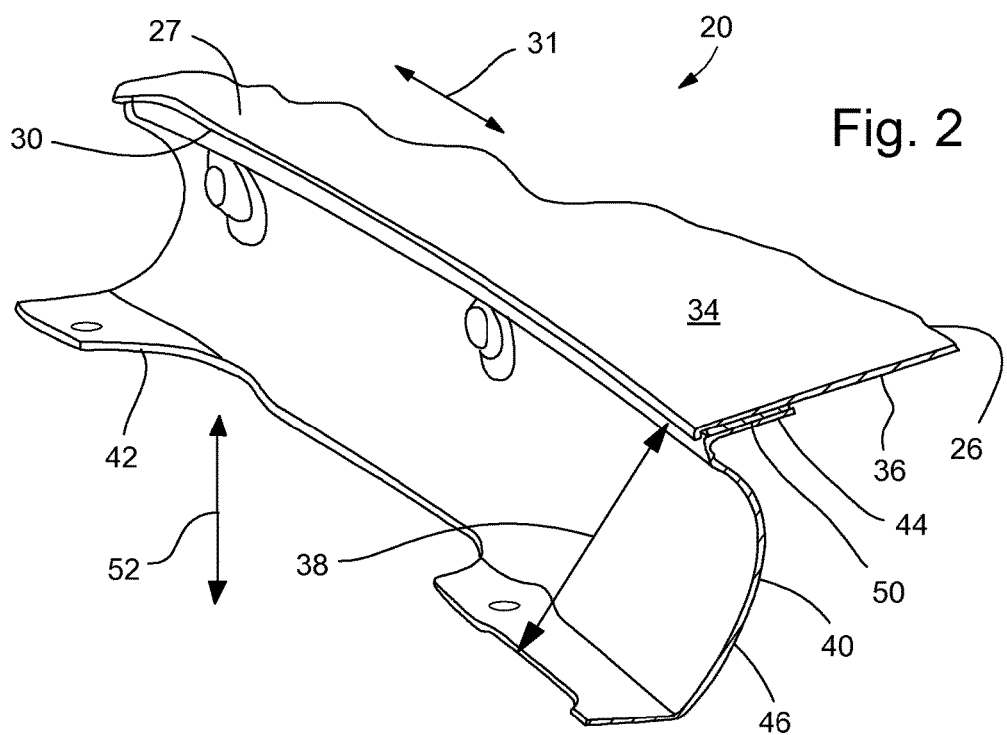
FIG. 2 is a schematic, partially sectional, perspective view of a portion of a front fender and energy absorption member.

Referring to FIGS. 1 and 2, a portion of an automotive vehicle, indicated generally at 20, is shown. The vehicle 20 includes vehicle structure 22, such as a body 24 and a front fender 26. The body 24 may include a wheel house 28 surrounding a portion of a front wheel (not shown). A laterally inner edge 30 of the fender 26 extends in a fore-and-aft (longitudinal) direction (arrow 31), defining a side edge of a hood opening 32. An upper outer skin portion 27 of the fender 26 includes an A-side surface 34, which is the surface visible from outside of the vehicle 20, and a B-side surface 36, which is the underside (generally unseen) surface of this same portion 27 of the fender 26 (i.e., just the back side of the sheet forming the A-side surface). The laterally inner edge 30 of the fender 26 is spaced from the wheel house 28 to form a crush gap 38 between the two. This crush gap 38 may be, for example, from about forty to about eighty millimeters tall.

The vehicle structure 22 also includes an energy absorption member 40 mounted in the crush gap 38. The member 40 runs generally fore and aft in the vehicle 20. The member 40 includes a body attachment flange 42, which is secured to the wheel house 28 by, for example, fasteners 48, a fender attachment flange 44, which is secured to the B-side 36 of the outer skin portion 27 of the fender 26 by, for example, adhesive 50, and an energy absorbing portion 46 extending between the body attachment flange 42 and the fender attachment flange 44. Other methods of securement, such as, for example, welding or rivets may be used instead, if so desired. The energy absorption member 40 may be made of, for example, sheet molding compound, carbon fiber, aluminum, steel, magnesium or other similarly suitable material. By securing the fender attachment flange 44 directly to the B-side 36 of the outer skin portion 27, the packaging space is minimized while still maintaining the esthetics and functionality.

In this embodiment, the member 40 has a generally Z-shaped or S-shaped cross section, with the fender attachment flange 44 extending outboard from the energy absorbing portion 46 and the body attachment flange 42 extending inboard from the energy absorbing portion 46. The energy absorbing member 40 is a single, continuous, monolithic piece extending in the fore-aft (longitudinal) direction 31 along the entire length of the laterally inner edge to wheel house interface. Being a single, monolithic piece extending the entire length fore-aft provides an esthetically pleasing surface seen from the hood opening, minimizes the number of parts, and allows for good underhood air flow.

The energy absorbing portion 46 is curved in a vertical direction 52 relative to the attachment flanges 42, 44, and the material is thick enough to hold the fender 26 in place under normal operating conditions while being thin and tall enough to collapse during an impact event. That is, the geometry of the energy absorbing portion 46 allows the energy absorption member 40 to crush during an impact event with the top of the fender 26, such as an impact with a pedestrian, in order to allow the fender 26 to give, thus absorbing some of the energy of the impact. A curved energy absorbing portion 46 allows this portion 46 to fold over onto itself, absorbing some of the energy of impact and allowing the fender 26 to move downward and in a cross-car (i.e., side-to-side) direction.

Being curved in the vertical direction 52 means, as can be seen in the cross-section portion of FIG. 2 (as well as FIGS. 3 and 4), that the curvature allows for further bending of the energy absorbing portion 46 when a vertical load is received on top of the fender 26. Put another way, the energy absorbing portion 46 is curved generally about an axis that extends generally in the fore-aft direction of the vehicle 20—again, allowing for a flexing of the top of the fender 26 (near the laterally inner edge 30) downward when an impact force presses downward on the fender 26. The crushing of the energy absorbing portion 46, due to the curved geometry, may also allow for some lateral (also called cross-car or side-to-side) movement or rotation as well.

The mounting of the energy absorption member 40 in the crush gap 38 allows the fender 26 to give during an impact event, with the energy absorbing portion 46 absorbing some of the energy of impact as it is crushed into the gap 38. The size of the crush gap 38, which affects the amount of crush, can be set to the desired amount for the desired crush/impact characteristics for the particular vehicle. Thus, the energy absorption member 40 creates a somewhat non-rigid mount of the top, inner portion of the fender 26 to the vehicle body 24, having more give than a conventional fender to body attachment.

Figure 3:
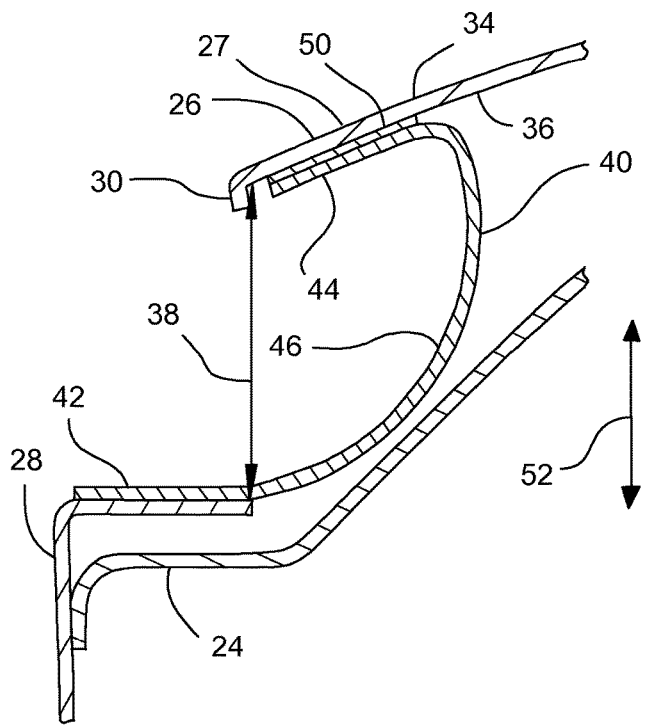
FIG. 3 is a schematic, cross sectional view of a portion of automotive vehicle structure according to another embodiment.

FIG. 3 illustrates another embodiment where the energy absorption member 40 is generally C-shaped, rather than S-shaped. The fender attachment flange 44 may still be attached to the B-side 36 of the upper outer skin portion 27 of the fender 26 with an adhesive 50 (or welding) adjacent to the laterally inner edge 30 of the fender 26, and is still a single, monolithic piece extending in the vehicle fore-aft direction. The body attachment flange 42 may still be attached to the wheel house 28 of the vehicle body 24. The energy absorbing portion 46 is again curved in the vertical direction 52, allowing for crush into the crush gap 38 during an impact event with the A-side 34 of the fender 26. Thus, the energy absorption member 40 will support the fender 26 during normal vehicle operation while providing crush (energy absorption) during an impact event. Again, the geometry of the energy absorption member 40 may allow for some lateral movement or rotation in addition to the vertical crush during an impact event.

Figure 4:
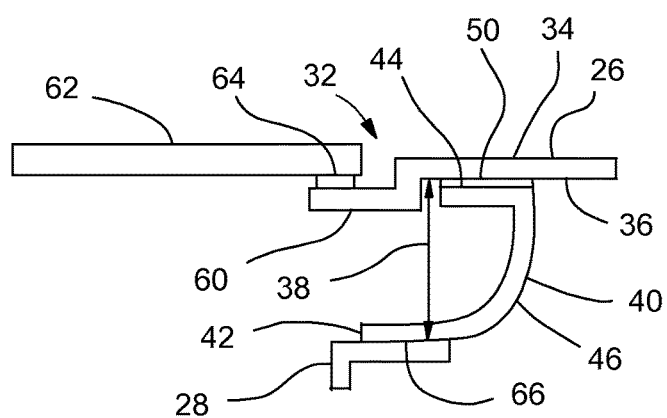
FIG. 4 is a schematic diagram of vehicle structure.

FIG. 4 is a block diagram of a cross section of some of the vehicle structure. FIG. 4 shows that the fender 26 may include an integral or separate fender hood support 60, extending into the hood opening 32, that supports a hood 62 in the vertical direction. The actual support may be provided by rubber or other elastomeric supports 64.

The fender 26 is supported by the energy absorption member 40 mounted in the crush gap 38, with the member 40 in turn supported by the wheel house 28, similar to FIG. 3. Adhesive 50 may secure the fender attachment flange 44 to the B-side 36 of the fender 26, while the body attachment flange 42 is secured to the wheel house 28 via a weld 66.

A downward impact force on the A-side 34 of the fender 26 or the hood 62 near the fender 26 may cause the energy absorbing portion 46 to crush, absorbing some of the energy of the impact.

While certain embodiments of the present invention have been described in detail, those familiar with the art to which this invention relates will recognize various alternative designs and embodiments for practicing the invention as defined by the following claims.

What is claimed is:

1. A vehicle structure comprising:
a body including a wheel house;
a hood having a hood side edge extending in a fore-and-aft direction;
a fender having an upper outer skin portion having an exposed A-side surface and an opposed B-side surface, the fender including a laterally inner edge extending in the fore-and-aft direction adjacent to the hood side edge, the laterally inner edge defining a portion of a hood opening within which the hood is mounted, the B-side surface adjacent to the laterally inner edge spaced from the wheel house in a vertical direction to define a crush gap, the fender also having a hood support extending from the upper outer skin portion laterally inboard under the hood and configured to continuously support the hood side edge in the vertical direction under vehicle operating conditions including during a pedestrian impact event on top of the hood or fender and when there is no pedestrian impact event;
at least one elastomeric support located under and contacting the hood and located above and contacting the hood support wherein the hood support supports the hood side edge via the at least one elastomeric support in the vertical direction under the vehicle operating conditions including during the pedestrian impact event and when there is no impact pedestrian event; and
an energy absorption member located in the crush gap between the wheel house and the fender, the energy absorption member having a fender attachment flange secured to the B-side surface of the fender adjacent to the laterally inner edge, a body attachment flange secured to the wheel house, and an energy absorbing portion extending between the fender attachment flange and the body attachment flange, the energy absorbing portion being curved in the vertical direction and be a single, monolithic piece that extends longitudinally along an entire length of a wheel house to fender upper outer skin portion interface;
wherein the energy absorption member is generally C-shaped, with the fender attachment flange extending inboard from the energy absorbing portion and the body attachment flange extending inboard from the energy absorbing portion.

2. A vehicle structure comprising:
a body including a wheel house;
a hood having a hood side edge extending in a fore-and-aft direction;
a fender having an upper outer skin portion having an exposed A-side surface and an opposed B-side surface, the fender including a laterally inner edge extending in the fore-and-aft direction adjacent to the hood side edge, the laterally inner edge defining a portion of a hood opening within which the hood is mounted, the B-side surface adjacent to the laterally inner edge spaced from the wheel house in a vertical direction to define a crush gap, the fender also having a hood support extending from the upper outer skin portion laterally inboard under the hood and configured to support the hood side edge in the vertical direction; and
an energy absorption member located in the crush gap between the wheel house and the fender, the energy absorption member having a fender attachment flange secured to the B-side surface of the fender adjacent to the laterally inner edge, a body attachment flange secured to the wheel house, and an energy absorbing portion extending between the fender attachment flange and the body attachment flange, the energy absorbing portion being curved in the vertical direction and being a single, monolithic piece that extends longitudinally along an entire length of a wheel house to fender upper outer skin portion interface, wherein the energy absorption member is generally C-shaped, with the fender attachment flange extending inboard from the energy absorbing portion and the body attachment flange extending inboard from the energy absorbing portion.

* * * * *